（12）United States Patent
Kjoller et al.

(10) Patent No.: US 7,665,889 B2
(45) Date of Patent: Feb. 23, 2010

(54) QUANTITATIVE CALORIMETRY SIGNAL FOR SUB-MICRON SCALE THERMAL ANALYSIS

(76) Inventors: Kevin Kjoller, 488 Vaquero La., Santa Barbara, CA (US) 93111; Azzedine Hammiche, 4 Kenilworth Place, Lancaster (GB) LA1 4HE ( * ) Notice: Subject to any disclaimer, the term of this patent is extended or adjusted under 35 U.S.C. 154(b) by 212 days.

(21) Appl. No.: 11/801,254

(22) Filed: May 8, 2007

(65) Prior Publication Data

US 2007/0263696 A1    Nov. 15, 2007

Related U.S. Application Data

(60) Provisional application No. 60/799,707, filed on May 11, 2006.

(51) Int. Cl.
*G01K 17/00* (2006.01)
(52) U.S. Cl. ............................................. 374/31
(58) Field of Classification Search ............... 374/31
See application file for complete search history.

(56) References Cited

U.S. PATENT DOCUMENTS

2006/0254345 A1*  11/2006  King et al. ............... 73/105

* cited by examiner

*Primary Examiner*—Andre J Allen
(74) *Attorney, Agent, or Firm*—Mark Rodgers

(57) ABSTRACT

The invention is a system and method for producing highly localized calorimetry data on a sample surface. The system is based on an SPM or other system with a probe and fine positioning capability. A heated probe is used to take a small sample (nano-sample) of a surface, and thereby make calorimetry measurements in a controlled manner.

10 Claims, 5 Drawing Sheets

QUANTITATIVE CALORIMETRY SIGNAL FOR SUB-MICRON SCALE THERMAL ANALYSIS

This application claims priority to U.S. provisional application Ser. No. 60/799,707, filed May 11, 2006.

FEDERALLY SPONSORED RESEARCH/SEQUENCE LISTING

Not Applicable

BACKGROUND OF THE INVENTION

This invention relates to quantitative calorimetry for high resolution thermal analysis using probe based technology. For the purposes of clarity of this application, the reduction to practice has been explained using a Scanning Probe Microscope (SPM) but the technique described herein can be practiced with any device that can provide precise control of X, Y and Z motion of the probe, such as, by way of example, a micromanipulator.

The family of thermal analysis techniques, collectively called micro-thermal analysis (micro-TA), has been in existence for nearly a decade now. Micro-TA methods are based on a scanning probe microscope in which the conventional passive probe, typically a cantilever arm with integral tip, is enhanced, typically by adding the capabilities to measure temperature and be resistively heated. This type of SPM is called scanning thermal microscopy SThM, and specifically in this application, SThM in which the probe is actively heated rather than the sample. This form of microscopy allows thermal properties such as thermal conductivity and diffusivity to be mapped on a sub-micron scale. The heated probe will cause highly localized surface effects due to temperature. Used with an SPM, which is extremely sensitive to height variations, measured by changes in the deflection of the cantilever probe, heating the surface will cause cantilever deflections due to local thermal expansion, material softening, or both. Additionally, the amount of power fed to the heater and the resistance of the heater can be plotted independently or compared to the changes in cantilever deflection. Also, the power fed to two probes, one on the sample surface and one away from the sample surface can be compared to create a differential signal. The differential signal is used either to produce localized analysis plots versus temperature that provide temperature dependent information at a specific position on the sample, or to construct an image whose contrasts represent variations in thermal conductivity and/or diffusivity across a scanned area.

Measurements as described above have been accomplished to map temperature dependent material properties on a scale smaller than achieved by conventional bulk thermal analysis techniques. However, to date scanning thermal microscopy has been used only to make qualitative measurements in terms of enthalpies associated with transitions. The SThM technique as practiced currently does not allow quantitative measurements of the enthalpies. The lack of quantitative information is due to the fact that the tip interaction with the surface from a heating standpoint has several inherently undefined parameters. In particular, it is difficult to know how much of the sample's volume is heated, how uniformly is the heated volume affected, and what is the area available for heat flow from the tip to surface. Also, because of the force between the tip and sample as the material undergoes phase transitions the contact area can change. All of these factors contribute to the fact that heat flow from the tip into the bulk of the sample is not well-defined.

SThM has proven useful, for instance, to, on a sub-micron scale, detect areas of different material in a material blend and determine the transition temperatures of the different materials. However since SThM does not measure enthalpy it does not on any scale provide the type of data available on bulk analysis systems such as the Differential Scanning Calorimetry (DSC) system. In a DSC system, the temperature can be calibrated by running melting standards but also the enthalpy can be calibrated. This can be done by measuring samples with known heats of fusion or known heat capacities. Typically calibrating the heat capacity is done using Sapphire samples, but in any case the calibration requires knowing the mass of the material heated, which in a bulk analysis system is always the case since a known (relatively large) quantity of material is subjected to a uniform heating. Again because of the lack of knowledge of the quantity of material affected by the SThM it has not been possible to date to quantitatively determine the enthalpy absorbed by the sample or eg the enthalpy of fusion. Following are a few examples of applications in which it is beneficial to have quantitative measurements of the enthalpy as demonstrated by using traditional DSC techniques. Probably the commonest use of the DSC curve is in "fingerprinting", in which simple or complex materials can be compared for identification, or quality control purposes, using measurements of thermal transition peak positions, sizes, or shapes as appropriate. The temperature at which peaks occur can lead to an identification of a particular component, and the size (usually the area, though the height is sometimes used) can give a measure of the amount of that component. Examples include the determination of quartz in clays, which is difficult by other methods, and the analysis of polymer blends. Analysis of the form of the fusion peak of a fairly pure (>98%) substance can, with certain restrictions, lead to a determination of its purity. This approach is used routinely with pharmaceuticals and fine chemicals in general. All of the above techniques would be of great utility if available on the resolution scale possible with SThM, such as for characterization and analysis of polymer or biological materials on the molecular scale. Therefore it is the object of this invention to provide quantitative thermal analysis techniques applicable to SThM.

SUMMARY OF THE INVENTION

The invention is a method and a system for producing quantitative highly localized calorimetry data on a sample surface. The preferred embodiments require system elements including a restively heated probe, a power source for the resistive heater on the probe, such that both the power to the probe can be varied and the resistance of the probe heater can be monitored, and a programmable control system adapted to position the probe, control the power source, and monitor the probe resistance. In some embodiments the system includes a program application, running on the programmable controller, or in others the invention may be manually operated. In either case the application or manual sequence consists of the following elements:

perform a baseline temperature/power measurement for the probe in a clean condition away from the surface, nano-sample the surface at a selected location either using a temperature program on the probe or by picking up a particle which adheres to the probe upon contact, determine the mass of the adhered sample perform a temperature/power measurement for the probe with adhered sample away from the surface, and subtract the baseline data from the sample data.

In some versions of the invention, the system elements are formed in part from an SPM, and the program application is further adapted to scan the sample surface in an SPM imaging mode to determine the locations to perform thermal analysis.

In some versions the resonant frequency of the probe is measured in the clean condition and re-measured with adhered sample, such that the mass of the adhered sample can be calculated. In other versions the probe is cleaned by heating sufficiently to remove material adhered to probe. And in further versions temperature modulation of the probe with adhered sample is done to determine sample heat capacity and/or thermal resistance between sample and probe.

BRIEF DESCRIPTION OF THE DRAWINGS

The invention will be better understood by referring to the following figures.

DETAILED DESCRIPTION OF THE INVENTION

It is assumed that one skilled in the art is familiar with the operation of a scanning probe microscope, and in particular, an atomic force microscope with a cantilever type probe. Such a microscope is the foundation for SThM. In the following description concepts such as scanning, imaging, and probe-sample interaction will be used with meanings known in the field of scanning probe microscopy, and only features pertinent to the novel techniques of the invention will be described in detail. It is also understood that most SPM's include a programmable control system allowing for a wide range of scanning, probe positioning, and deflection measurements which may be optimized for a particular application.

Figure 1:
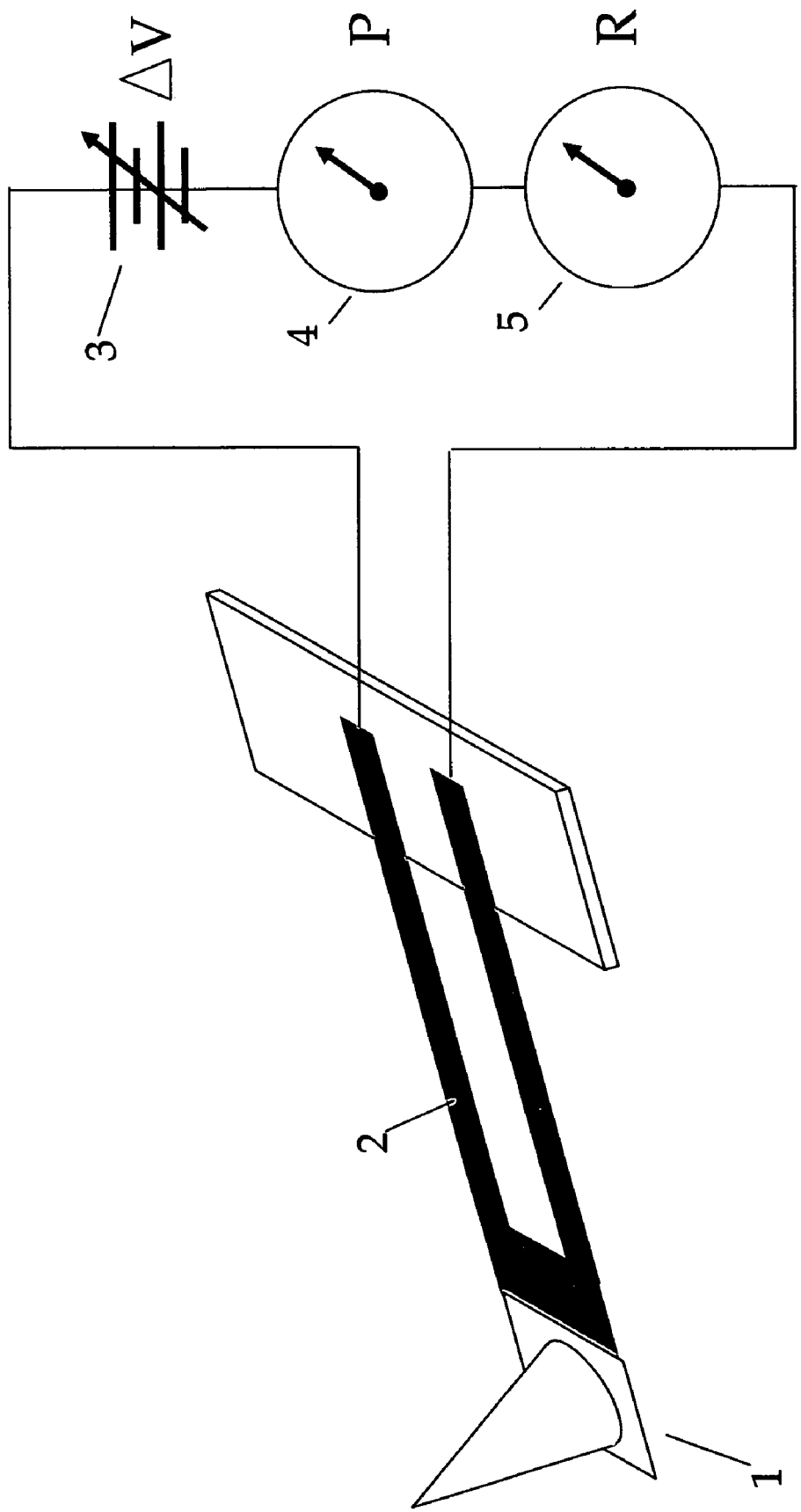
FIG. 1 illustrates a thermal probe cantilever as configured to perform the techniques of the invention.

FIG. 1 shows a cantilever probe at 1. Only the probe is shown, and the scanning, deflection detection and other functional parts of the SThM are assumed. The probe has a heating resistive element 2. The probe with heater may be a bent wire type of probe known in the thermal microscope art, a microfabricated probe with integral heater, or any other probe suitable for use in a SThM. The resistive heater 2 is disposed in such a way as to heat the part of the cantilever in contact with the surface, typically a sharp tip but in this application the probe end may also be a variety of forms that allow material to be picked up onto the probe. The heater is connected to a circuit which applies a controlled voltage and current to the heater. The power source 3 is typically an external device wired to connect to the heater element on the probe in a fashion compatible with interchangeable probes.

Figure 3:
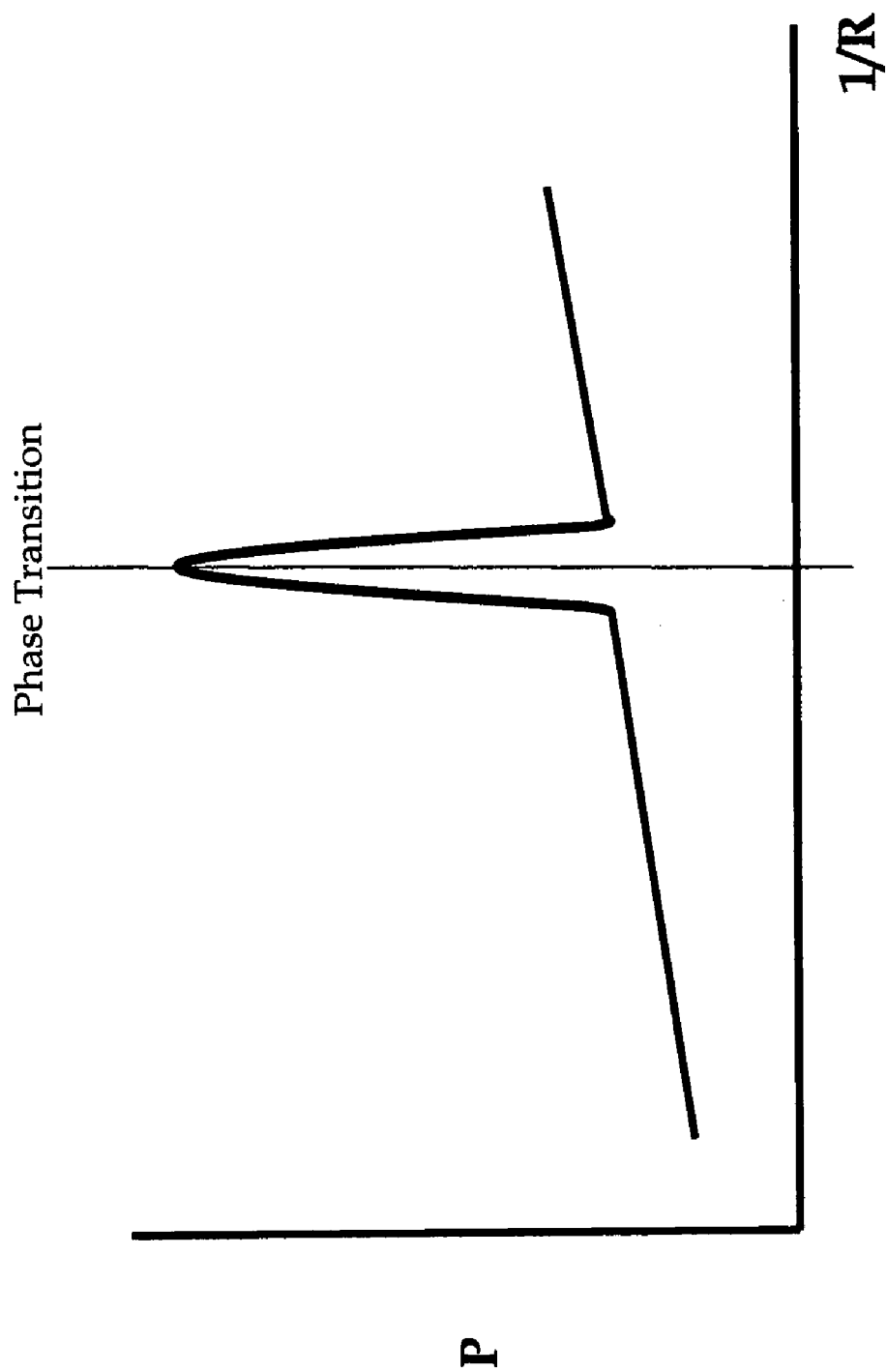
FIG. 3 shows a simplified illustration of a material phase transition measured with the probe of FIG. 2.

Power source 3 is preferentially controllable to the extent that a variety of power waveforms may be applied to the heater to accomplish different types of thermal analysis. A particularly useful form of analysis is called Differential Thermal Analysis, or DTA. In, DTA, the probe is positioned at a point on a sample surface, and heating profiles are applied to the probe-sample interface by applying suitable power waveforms to the heater. Typically for SThM, the power drawn is monitored 4, and the resistance of the heater, which will vary with heater temperature is also monitored 5. As shown in FIG. 3, the temperature of the heater is increased, which is inferred by monitoring heater resistance, and the power applied to the heater is kept at an appropriate level to maintain a desired heater temperature profile, typically a ramp increase in temperature is used. At the point of a phase transition of the surface material, the power drawn by the heater changes as a peak as shown in the figure, which would typically characterize a melting transition. Alternatively, there can be a step change or a linear increase in heat capacity for other transitions such as a Glass transition (Tg). Thus the heater, combined with a programmable power source, resistance and power monitoring capability, is capable of providing both the heating and measurement of the transition temperature in an area local to the probe. Usually a differential signal is produced by performing the same sequence of steps simultaneously with another probe which is not in contact with a sample or sequentially by using the same probe on a different sample or not in contact with a sample and subtracting the resultant curves (or a combination of these two). The temperature at which the phase transition occurs is dependent on the material properties of the material heated. Thus the above technique allows for the transition temperature to be measured for a very small area when using an SThM tip as the heater, resulting in very high spatial resolution for material differentiation.

However, to identify the material and the properties of the material it is useful to know not only the position of transitions (start, end and peak) but also the size, which is related to the enthalpy of the process or transition, and the shape, which can be related to the kinetics of the process. In order for these aspects of the peak to be quantified in a repeatable way it is important that the quantity of the material undergoing the phase transition must be known. In bulk analyzers surface area of contact between heater and material is known to quantify heat flow, but alternatively knowing the heating uniformity of a sample from some other means could serve as well. Bulk Thermal analyzers carefully control these parameters and are thereby able to provide quantitative material information. Micro-TA to date is limited to measurements of transition temperatures as opposed to quantitative measurement of enthalpy.

Figure 2:
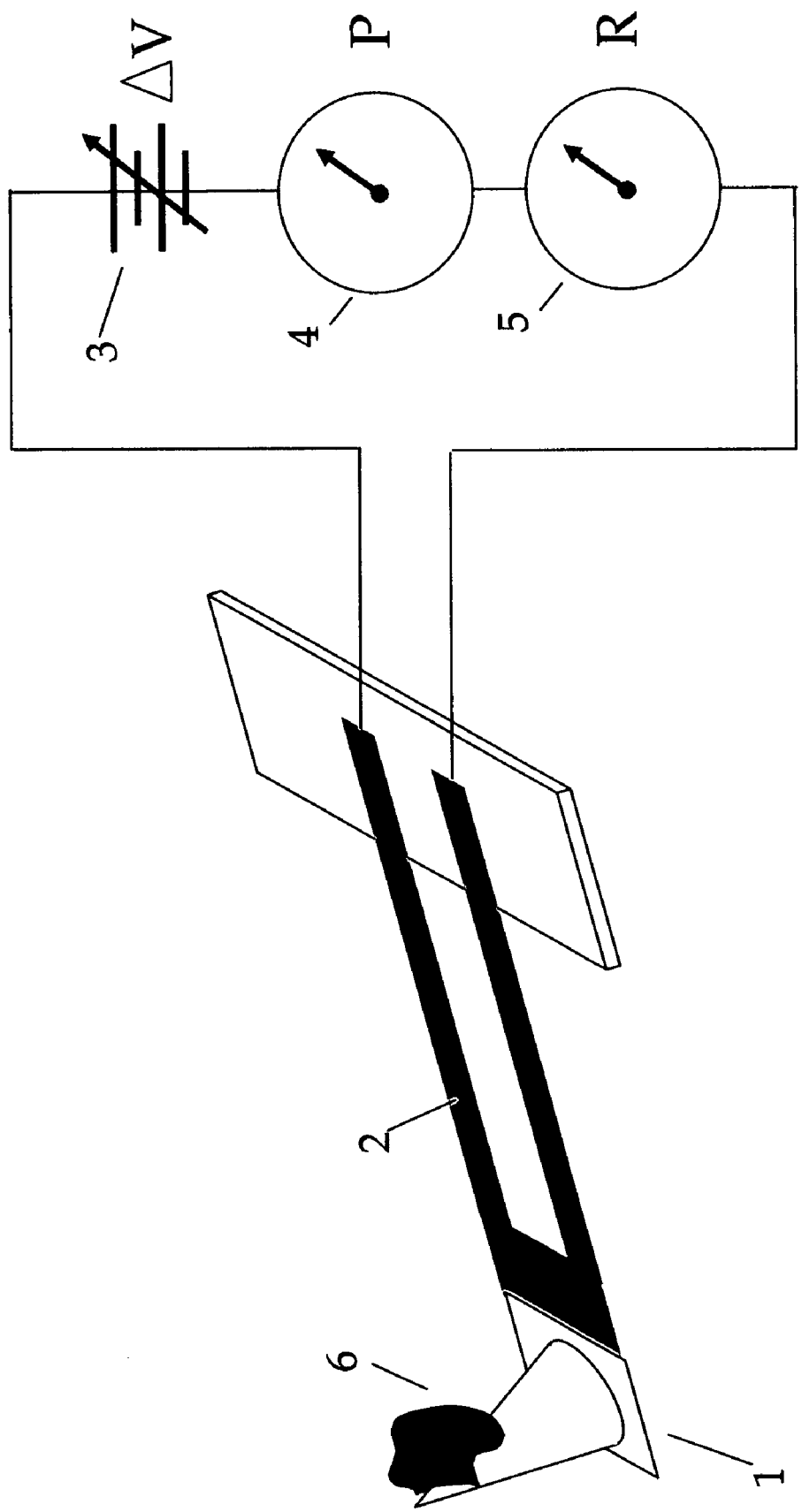
FIG. 2 shows the cantilever with a portion of the sample adhered to the probe tip.
Figure 5:
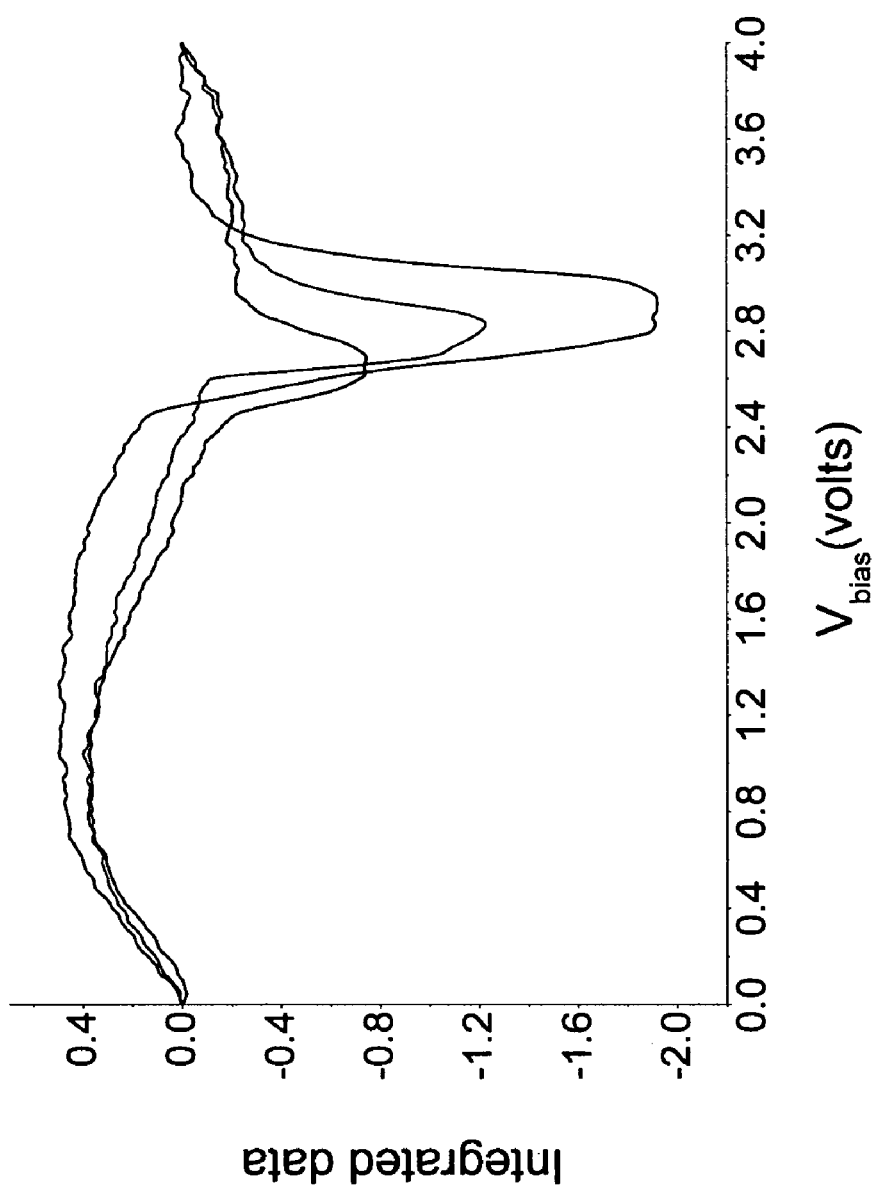
FIG. 5 shows some actual corrected differential transition data from a nano-sampled specimen.

A technique called nano-sampling for use in SThM can be applied to this problem. As illustrated in FIG. 2, a portion of the sample surface 6 is removed from the surface by adhering the portion 6 to the probe. This can be accomplished by applying an appropriate temperature program (eg pulse, linear ramp etc) to the heater which results in removal of some material, part of which sticks to the tip when the tip cools after the adhering step. Alternatively a combination of vertical and or lateral motion of the tip can be performed while the tip and sample are in a heated state, to scoop up a portion of the sample, and then the probe is retracted from the sample surface and allowed to cool. The technique can also be used to pick up whole individual particles resting on a surface as opposed to part of the surface. To date this process, called nano-sampling, has been used to remove small controlled pieces of a surface, resulting in high spatial resolution sampling, and delivering the pieces, in various ways, to an external chemical analyzer, such as a chromatograph. But the goal of this application is to use nano-sampling to measure enthalpies associated with transitions and thus enable, for the first time, quantitative calorimetry using only an SThM (and more generally, any device that can control the motion of a probe very precisely in X, Y and Z axes). FIG. 5 shows some data obtained by picking up particulate material onto the probe, ramping the voltage applied to the probe and measuring the resistance of the probe. This data has been further processed to make a differential measurement by subtracting a baseline with no material on the probe and also integrated. The size of the peak in these plots then correlates to the enthalpy of the melting transition in this material.

Figure 4:
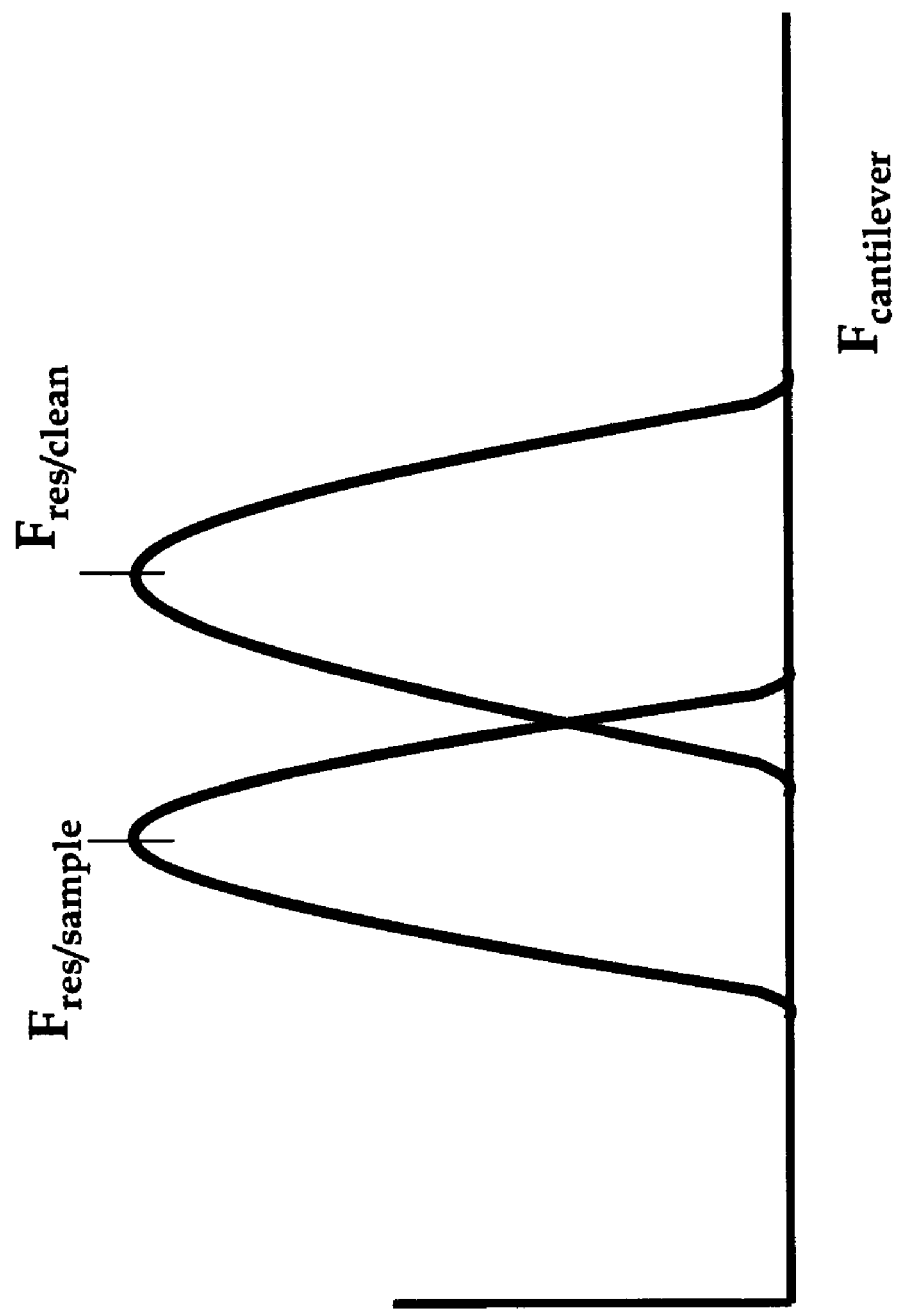
FIG. 4 illustrates a technique to measure the mass of the material adhered to the probe tip.

Most commercial SThM's are based on AFM's which include the ability to vibrate the cantilever probe, and monitor the vibration using the probe deflection signal. The resonant frequency of the probe can also be determined without vibrating the cantilever by use of the "thermal noise method". This method uses spectrum analysis to identify the fundamental resonance of the cantilever due to the thermal motion of the cantilever at its resonance. As shown in FIG. 4, the resonant frequency of the cantilever may be measured before and after a nano-sampling operation. Since the cantilever is of a known physical configuration, the change in resonant frequency due to mass of the nano-sample allows the mass of the adhered nano-sample to be calculated. This is one technique used in the SPM field to determine the mass of a particle attached to the tip. There are other methods that have been developed for mass detection of a tip/particle. For large particles measuring the deflection change of the cantilever due to the gravitational force on the cantilever is a technique known to those skilled in the art. The thermal analysis process described above can be performed by causing material to adhere to the tip, pulling the tip away from the surface with the nano-sample adhered, and measuring the heat flow into the sample by ramping the temperature of the tip and adhered sample while monitoring the power or resistance of the probe as compared with another probe that has no attached material or by subsequent measurement using the same probe with no material attached. (or a combination). Furthermore, the small size of the nano-sample means it is a reasonable assumption to make that the nano-sample is heated uniformly, and to a good approximation, all of it undergoes the phase transition at the same time. Also, since the probe is not pushing against the material on a surface, the heat does not flow into the bulk of the sample in an ill-defined way. Thus the important unknowns in performing the measurement on the surface are eliminated by performing the measurement on a removed sample.

Furthermore, the use of temperature modulation can be advantageous. In a non-transition temperature region, an AC measurement can be used to measure the total heat capacity of the sample and this measurement can be used to calibrate the DC measurement of heat capacity. Temperature modulation can also be used to measure the thermal resistance between the probe and the nano-sample which in turn is related to the contact area. By performing modulation at multiple frequencies simultaneously or sequentially, both the heat capacity of a nano-sample and the thermal resistance between the tip and the nano-sample can be determined by numerical or other fitting procedures based on models well known to those skilled in the art of using modulated temperature differential scanning calorimetry.

Thus the following process is given as an example of practicing the invention to achieve quantitative calorimetry of transition:

1. Scan a sample surface in imaging mode to determine places to perform thermal analysis. (optional step)

2. Clean cantilever by heating sufficiently to remove material adhered to probe. (optional step)

3. Measure resonant frequency of clean probe. (optional step)

4. Perform a baseline temperature/power measurement for the probe away from the surface.

5. Nano-sample surface at a selected location either using a temperature program on the probe or by picking up the particle which may simply adhere to the probe upon contact.

6. Calculate quantity of sample (Could do it via determining resonant frequency of probe/with adhered sample or other techniques)

7. Use temperature modulation to determine sample heat capacity and or thermal resistance between sample and probe (optional step)

8. Perform temperature/power measurement and subtract baseline

Thus techniques have been shown which produce high spatial resolution, quantitative calorimetry resulting in convenient, inexpensive, fast material characterization. As indicated earlier this technique can be practiced with any device that can control the probe motion accurately in X, Y and Z axes and the SPM is indicated in this application as an example of such a device. While the description here is of one probe being used, the technique can be practiced with more than one probe (or an array of probes) operating either in series or in parallel.

We claim:

1. A system for producing quantitative highly localized calorimetry data on a sample surface, comprising;
    a restively heated probe,
    a power source for the resistive heater on the probe, wherein both the power to the probe is variable and the resistance of the probe heater is monitored,
    a programmable control system adapted to position the probe, control the power source, and monitor the probe resistance; and,
    a program application, running on the programmable controller, adapted to;
        perform a baseline temperature/power measurement for the probe in a clean condition away from the surface, nano-sample the surface at a selected location either using a temperature program on the probe or by picking up a particle which adheres to the probe upon contact,
        determine the mass of the adhered sample; and
        perform a temperature/power measurement for the probe with adhered sample away from the surface, and subtract the baseline data from the sample data.

2. The system of claim 1 wherein the system elements are formed in part from an SPM, and the program application is further adapted to scan the sample surface in an SPM imaging mode to determine the locations to perform thermal analysis.

3. The system of claim 1 wherein the program application determines the mass of the sample by being further adapted to measure the resonant frequency of the probe in the clean condition and re-measure the resonant frequency of probe with adhered sample, such that the mass of the adhered sample can be calculated.

4. The system of claim 1 wherein the program application is further adapted to clean the probe by heating sufficiently to remove material adhered to probe.

5. The system of claim 1 wherein the program application is further adapted to perform temperature modulation of the probe with adhered sample to determine sample heat capacity and/or thermal resistance between sample and probe.

6. A method for producing quantitative highly localized calorimetry data on a sample surface using a system which includes a restively heated probe, a power source for the resistive heater on the probe, wherein both the power to the probe is variable and the resistance of the probe heater is monitored, and a control system adapted to position the probe, control the power source, and monitor the probe resistance, comprising;

performing a baseline temperature/power measurement for the probe in a clean condition away from the surface, nano-sampling the surface at a selected location either using a temperature program on the probe or by picking up a particle which adheres to the probe upon contact, determining the mass of the sample; and, performing a temperature/power measurement for the probe with adhered sample away from the surface, and subtracting the baseline data from the sample data.

7. The method of claim 6 wherein the system elements are formed in part from an SPM, further comprising scanning the sample surface in an SPM imaging mode to determine the locations to perform thermal analysis.

8. The method of claim 6 where the mass determining step comprises;

measuring the resonant frequency of the probe in the clean condition, re-measuring the resonant frequency of probe with adhered sample, and;

calculating the mass of the adhered sample from the shift of the resonant frequency of the probe.

9. The method of claim 6 further comprising cleaning the probe by heating the probe sufficiently to remove material adhered to probe.

10. The method of claim 6 further comprising performing temperature modulation of the probe with adhered sample to determine sample heat capacity and/or thermal resistance between sample and probe.

* * * * *